United States Patent
Kim et al.

(10) Patent No.: US 11,812,123 B2
(45) Date of Patent: Nov. 7, 2023

(54) ELECTRONIC DEVICE INCLUDING PLURALITY OF CAMERAS DISPOSED UNDER DISPLAY PANEL AND HAVING DIFFERENT PATTERNS DISPOSED ON LENSES OF PLURALITY OF CAMERAS

(71) Applicant: Samsung Electronics Co., Ltd., Suwon-si (KR)

(72) Inventors: Eunho Kim, Suwon-si (KR); Jeongwon Lee, Suwon-si (KR); Jeongyeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 17/321,742

(22) Filed: May 17, 2021

(65) Prior Publication Data

US 2021/0368081 A1 Nov. 25, 2021

(30) Foreign Application Priority Data

May 19, 2020 (KR) .................. 10-2020-0060003

(51) Int. Cl.
  *H04N 23/45* (2023.01)
  *H04N 5/265* (2006.01)
  (Continued)

(52) U.S. Cl.
  CPC ............ *H04N 23/45* (2023.01); *H04N 5/265* (2013.01); *H04N 9/3179* (2013.01); *H04N 23/57* (2023.01)

(58) Field of Classification Search
  CPC .... H04N 5/2258; H04N 5/2257; H04N 5/265; H04N 9/3179
  See application file for complete search history.

(56) References Cited

U.S. PATENT DOCUMENTS

| 7,214,926 B2 | 5/2007 | Gruhlke et al. |
| 7,714,923 B2 | 5/2010 | Cok et al. |

(Continued)

FOREIGN PATENT DOCUMENTS

| CN | 108900672 A | 11/2018 |
| CN | 109100892 A | 12/2018 |

(Continued)

OTHER PUBLICATIONS

International Search Report with Written Opinion dated Sep. 16, 2021, issued in International Patent Application No. PCT/KR2021/006169.

(Continued)

*Primary Examiner* — Mekonnen D Dagnew
(74) *Attorney, Agent, or Firm* — Jefferson IP Law, LLP

(57) ABSTRACT

An electronic device is provided. The electronic device includes a display panel and a first camera and a second camera disposed under the display panel. The display panel includes an emissive layer including a plurality of pixels and a patterned layer disposed between the emissive layer and the first camera or the second camera. The patterned layer includes a first patterned portion disposed on a front surface of a first lens of the first camera and a second patterned portion that is disposed on a front surface of a second lens of the second camera and that has a different shape from the first patterned portion. Besides, it may be permissible to prepare various other embodiments speculated through the specification.

22 Claims, 10 Drawing Sheets

(51) Int. Cl.
*H04N 9/31* (2006.01)
*H04N 23/57* (2023.01)

(56) References Cited

U.S. PATENT DOCUMENTS

| | | |
|---|---|---|
| 9,692,955 B1 | 6/2017 | Premutico et al. |
| 9,769,388 B2 | 9/2017 | Han |
| 10,027,869 B2 | 7/2018 | Premutico et al. |
| 10,136,071 B2 | 11/2018 | Han |
| 10,855,892 B2 | 12/2020 | Chao |
| 10,911,656 B2 | 2/2021 | McMillan et al. |
| 2006/0108505 A1 | 5/2006 | Gruhlke et al. |
| 2008/0106628 A1 | 5/2008 | Cok et al. |
| 2008/0165267 A1* | 7/2008 | Cok .............. H04N 7/144 348/E5.022 |
| 2012/0106063 A1* | 5/2012 | Mathew .......... H04M 1/0264 349/110 |
| 2015/0207999 A1 | 7/2015 | Han |
| 2017/0272631 A1 | 9/2017 | Premutico et al. |
| 2018/0007281 A1 | 1/2018 | Han |
| 2018/0033839 A1* | 2/2018 | Hack .............. H10K 50/822 |
| 2019/0158713 A1 | 5/2019 | McMillan et al. |
| 2020/0099836 A1 | 3/2020 | Chao |
| 2021/0200020 A1 | 7/2021 | Kim et al. |

FOREIGN PATENT DOCUMENTS

| | | |
|---|---|---|
| CN | 110244484 A | 9/2019 |
| KR | 10-2019-0140384 A | 12/2019 |

OTHER PUBLICATIONS

Zhou et al., Image Restoration for Under-Display Camera, Cornell University Library, Ithica, NY 14853, Mar. 10, 2020.
Extended European Search Report dated Sep. 22, 2023, issued in European Application No. 21809191.6.

* cited by examiner

ELECTRONIC DEVICE INCLUDING PLURALITY OF CAMERAS DISPOSED UNDER DISPLAY PANEL AND HAVING DIFFERENT PATTERNS DISPOSED ON LENSES OF PLURALITY OF CAMERAS

CROSS-REFERENCE TO RELATED APPLICATION(S)

This application is based on and claims priority under 35 U.S.C. § 119(a) of a Korean patent application number 10-2020-0060003, filed on May 19, 2020, in the Korean Intellectual Property Office, the disclosure of which is incorporated by reference herein its entirety.

BACKGROUND

1. Field

The disclosure relates to a plurality of cameras and an electronic device including the same.

2. Description of Related Art

A smartphone or an electronic device such as a tablet personal computer (PC) may include a camera (or, a camera module or a camera device) and may take a picture or a video.

Nowadays, as an active area of a display is expanded, a full front display in which most of one surface (e.g., a front surface) of an electronic device is implemented as the active area of the display is being launched. In this case, a camera module in a first surface (e.g., the front surface) may be disposed under a display panel (an under display camera (UDC)). The electronic device may obtain image data using light passing through the display panel and a lens of the camera module.

The above information is presented as background information only to assist with an understanding of the disclosure. No determination has been made, and no assertion is made, as to whether any of the above might be applicable as prior art with regard to the disclosure.

SUMMARY

When an electronic device includes an under display camera (UDC), image quality degradation may occur due to characteristics of a pattern in a display panel. For example, diffraction or scattering of light due to the pattern in the display panel may cause attenuation of components in some frequency bands, which may lead to a reduction in resolution. Alternatively, when a light source is photographed, a light flare being a light burst may be lost. The electronic device may compensate for an image quality of the under display camera (UDC) in a software manner such as signal processing or deep learning. In this case, when the degree of attenuation of a signal is high, it may be difficult to recover a lost frequency component, and the image quality degradation may not be completely compensated for.

Aspects of the disclosure are to address at least the above-mentioned problems and/or disadvantages and to provide at least the advantages described below. Accordingly, an aspect of the disclosure is to provide an electronic device for obtaining and/or storing an image of a subject using a plurality of cameras included in the electronic device and patterns of a display panel that correspond to the plurality of cameras, respectively. Furthermore, another aspect of the disclosure is to provide a method for processing (e.g., synthesizing or combining) images in an electronic device (e.g., an image processor) and an electronic device for performing the method.

Additional aspects will be set forth in part in the description which follows and, in part, will be apparent from the description, or may be learned by practice of the presented embodiments.

In accordance with an aspect of the disclosure, an electronic device is provided. The electronic device includes a display panel and a first camera module and a second camera module disposed under the display panel. The display panel includes an emissive layer including a plurality of pixels and a patterned layer disposed between the emissive layer and the first camera module or the second camera module. The patterned layer includes a first patterned portion disposed on a front surface of a first lens of the first camera module and a second patterned portion that is disposed on a front surface of a second lens of the second camera module and that has a different shape from the first patterned portion.

In accordance with another aspect of the disclosure, an electronic device is provided. The electronic device includes a display panel and a plurality of camera modules disposed under the display panel. The display panel includes an emissive layer including a plurality of pixels and a patterned layer disposed between the emissive layer and the plurality of camera modules, and the patterned layer includes different patterned portions on front surfaces of lenses included in the plurality of camera modules.

In accordance with another aspect of the disclosure, an image processing method performed in an electronic device is provided. The image processing method includes obtaining first image data through a first camera module of the electronic device and obtaining second image data through a second camera module of the electronic device, converting the first image data by reflecting a first characteristic of a first lens of the first camera module and converting the second image data by reflecting a second characteristic of a second lens of the second camera module, and generating an image by combining the converted first image data and the converted second image data. The first camera module and the second camera module are disposed under a display panel of the electronic device, and different patterns are formed on a front surface of the first lens and a front surface of the second lens.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
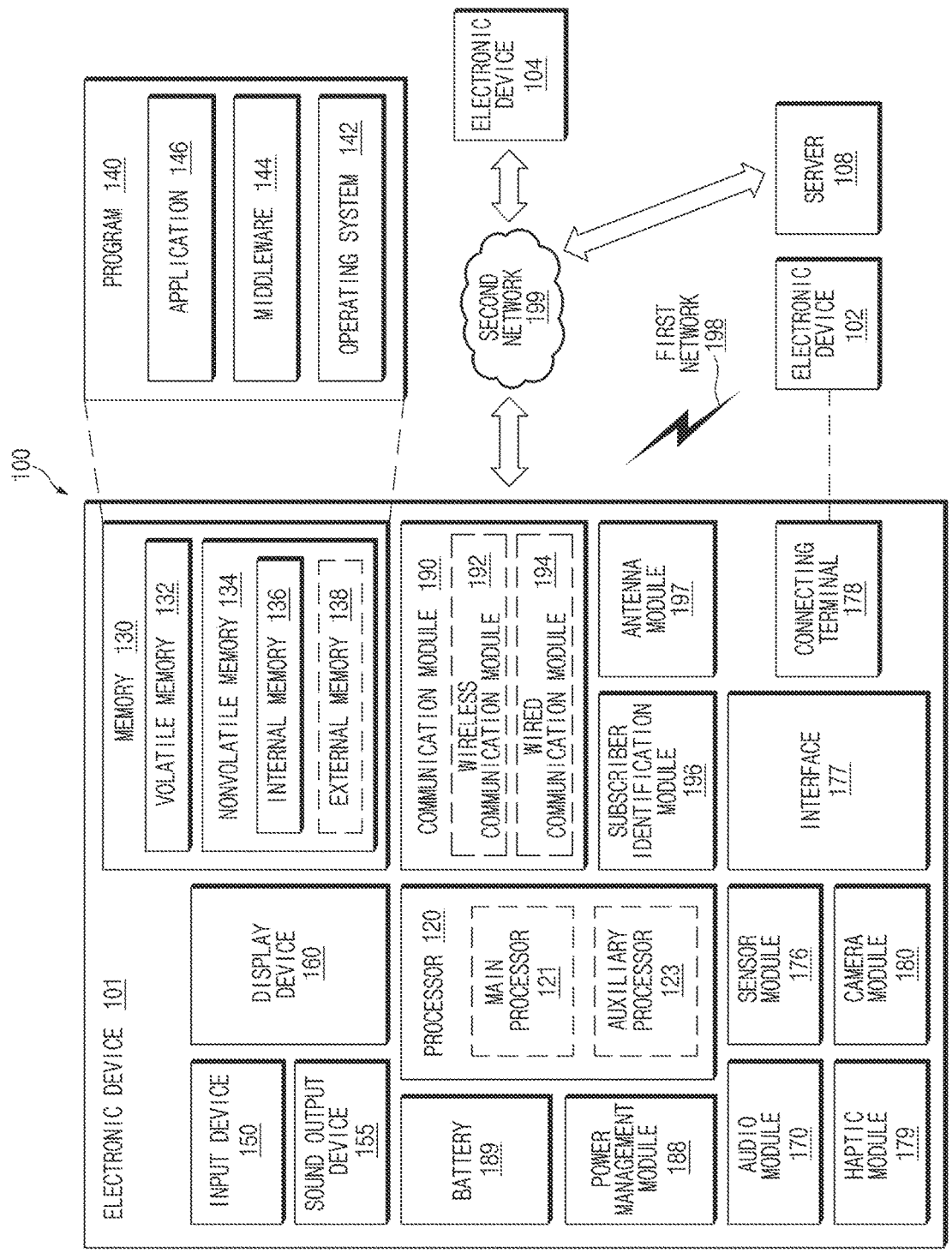
FIG. 1 is a block diagram of an electronic device in a network environment according to an embodiment of the disclosure.

FIG. 1 is a block diagram of an electronic device in a network environment according to an embodiment of the disclosure.

Electronic devices according to various embodiments disclosed in the disclosure may be various types of devices. An electronic device may include at least one of, for example, a portable communication device (e.g., a smartphone, a computer device (e.g., a personal digital assistant (PDA)), a tablet PC, a laptop PC, a desktop PC, a workstation, or a server), a portable multimedia device (e.g., e-book reader or moving picture experts group (MPEG-1 or MPEG-2) audio layer 3 (MP3) player), a portable medical device (e.g., heart rate, blood sugar, blood pressure, or body temperature measuring device), a camera, or a wearable device. The wearable device may include at least one of an accessory type device (e.g., watches, rings, bracelets, anklets, necklaces, glasses, contact lenses, or head wearable device head-mounted-device (HMD)), a fabric or clothing integral device (e.g., an electronic clothing), a body-attached device (e.g., skin pads or tattoos), or an bio implantable circuit. In some embodiments, the electronic device may include at least one of, for example, a television, a digital video disk (DVD) player, an audio device, an audio accessory device (e.g., a speaker, headphones, or a headset), a refrigerator, an air conditioner, a cleaner, an oven, a microwave oven, a washing machine, an air purifier, a set top box, a home automation control panel, a security control panel, a game console, an electronic dictionary, an electronic key, a camcorder, or an electronic picture frame.

In another embodiment, the electronic device may include at least one of a navigation device, global navigation satellite system (GNSS), an event data recorder (EDR) (e.g., black box for vehicle/ship/airplane), an automotive infotainment device (e.g., vehicle head-up display), an industrial or home robot, a drone, automated teller machine (ATM), a point of sales (POS) instrument, a measurement instrument (e.g., water, electricity, or gas measurement equipment), or an Internet of Things device (e.g. bulb, sprinkler device, fire alarm, temperature regulator, or street light). The electronic device according to the embodiment of the disclosure is not limited to the above-described devices. Further, for example, as in a smart phone equipped with measurement of biometric information (e.g., a heart rate or blood glucose) of an individual, the electronic device may have a combination of functions of a plurality of devices. In the disclosure, the term "user" may refer to a person using the electronic device or a device (e.g., an artificial intelligence electronic device) using the electronic device.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
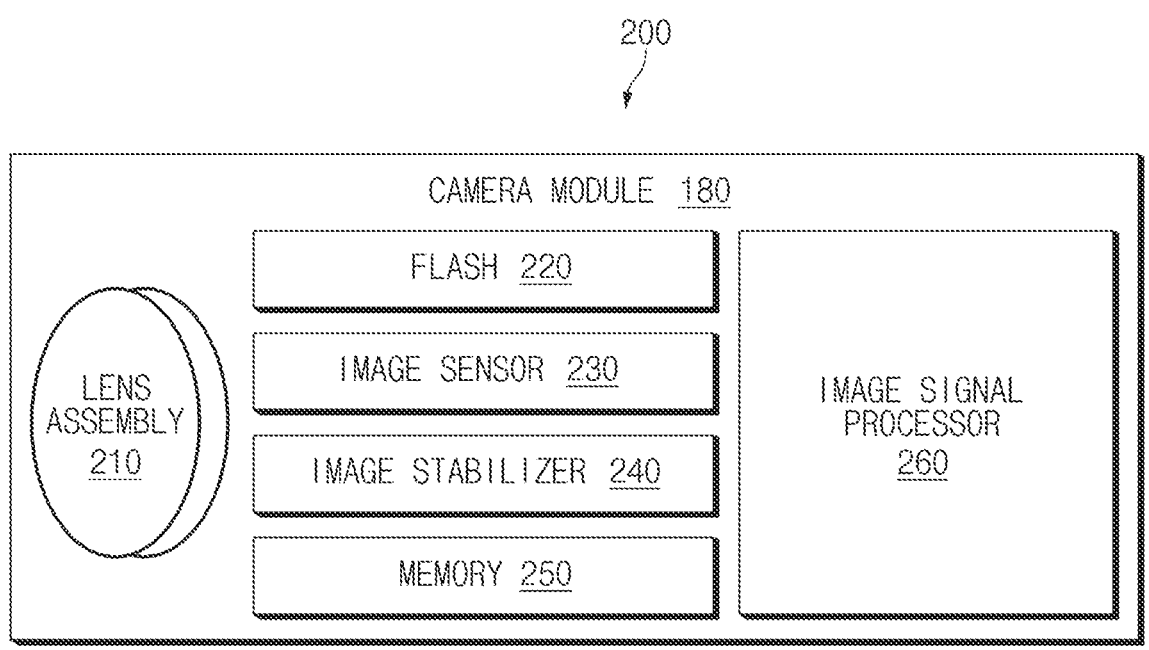
FIG. 2 is a block diagram illustrating a camera module according to an embodiment of the disclosure.

FIG. 2 is a block diagram illustrating a camera module according to an embodiment of the disclosure.

Referring to FIG. 2, depicting a block diagram 200, camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera. Furthermore, the plurality of camera modules 180 may include at least one of a wide-angle camera, a telephoto camera, a color camera, a monochrome camera, or an infrared (IR) camera (e.g., a time of flight (TOF) camera, a structured light camera). According to an embodiment, the IR camera may be operated as at least a part of a sensor module (e.g., the sensor module 176 of FIG. 1). For example, the TOF camera may be operated as at least a part of a sensor module (e.g., the sensor module 176 of FIG. 1) for detecting a distance to a subject.

Figure 3:
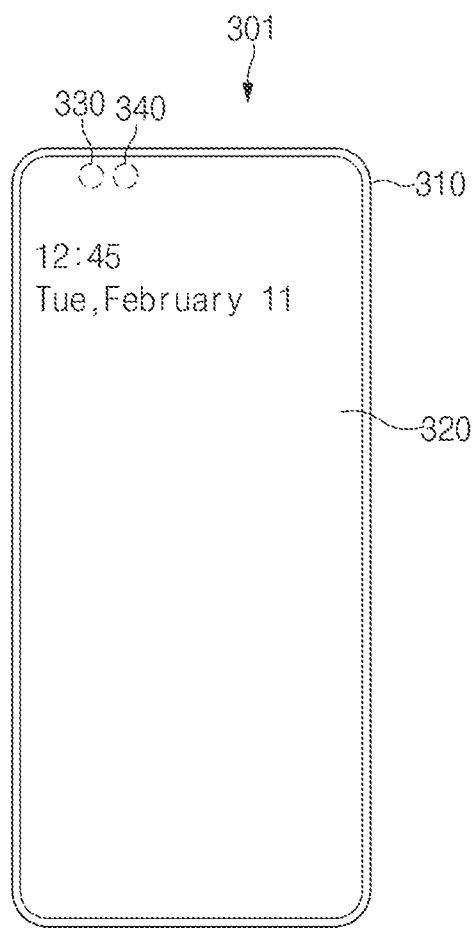
FIG. 3 illustrates an electronic device according to an embodiment of the disclosure.

FIG. 3 illustrates an electronic device according to an embodiment of the disclosure.

Referring to FIG. 3, an electronic device 301 may include a main body 310, a display 320 (e.g., the display device 160 of FIG. 1), a first camera module 330 (e.g., the camera module 180 of FIG. 1 or FIG. 2), and a second camera module 340 (e.g., the camera module 180 of FIG. 1 or FIG. 2). Although FIG. 3 illustrates an example that the electronic device 301 includes the two camera modules, the disclosure is not limited thereto.

According to various embodiments, the main body (or, the housing) 310 may contain various components required for operations of the electronic device 301. For example, the main body 310 may contain various components such as a circuit board (e.g., a printed circuit board (PCB), a flexible PCB, or a rigid-flexible PCB), a processor (e.g., the processor 120 of FIG. 1), a memory (e.g., the memory 130 of FIG. 1), or a communication module (e.g., the communication module 190 of FIG. 1).

According to various embodiments, the display 320 may be disposed on a first surface (e.g., a front surface) of the main body 310, and the first camera module 330 and the second camera module 340 may be disposed to face toward the first surface. For example, the first camera module 330 and the second camera module 340 may not be visually exposed and may be under display cameras (UDCs).

Although FIG. 3 illustrates an example that the first camera module 330 and the second camera module 340 are disposed to face toward the first surface (e.g., the front surface, or the surface on which the display 320 is mainly disposed) of the main body 310, the disclosure is not limited thereto. For example, when the display 320 extends to a second surface (e.g., a rear surface) of the main body 310, the first camera module 330 and the second camera module 340 may be disposed to face toward the second surface (e.g., the rear surface) of the main body 310.

The display 320 may display various pieces of contents such as text or images. The display 320 may be implemented with a plurality of layers. For example, the display 320 may have a structure in which a window layer, a touch screen panel, a display panel, and/or a protective layer are sequentially stacked (refer to FIG. 4).

The display 320 may pass external light through at least partial regions in which the first camera module 330 and the second camera module 340 are disposed. For example, the display 320 may pass the external light through empty spaces among pixels included in the display 320. The first camera module 330 and the second camera module 340 may take an image using the external light incident through the display 320.

The first camera module (or, the first camera device) 330 and the second camera module (or, the second camera device) 340 may be disposed to face toward the first surface of the main body 310. The first camera module 330 and the second camera module 340 may be disposed on a rear surface (an opposite surface facing away from a surface on which an image is displayed) of the display panel included in the display 320 and may be hidden so as not to be visible to a user from the outside.

According to an embodiment, the first camera module 330 and the second camera module 340 may be devices of the same type. For example, the first camera module 330 and the second camera module 340 may be devices having substantially the same modulation transfer function (MTF) characteristics. According to another embodiment, the first camera module 330 and the second camera module 340 may be different types of devices. For example, the first camera module 330 may be a camera including a wide angle lens, and the second camera module 340 may be a camera including a telephoto lens.

According to an embodiment, the first camera module 330 and the second camera module 340 may be disposed in regions where at least parts of the layers included in the display 320 are removed. For example, a layer (e.g., a shielding layer) through which external light cannot pass may be removed, and lenses (e.g., lenses 331 and 341 of FIG. 4) of the first camera module 330 and the second camera module 340 may be disposed in the region where the layer is removed.

According to various embodiments, metal layers (hereinafter, referred to as patterned layers) having different patterns may be disposed on front surfaces of a first lens (e.g., the first lens 331 of FIG. 4) of the first camera module 330 and a second lens (e.g., the lens 341 of FIG. 4) of the second camera module 340. For example, a patterned layer (e.g., a patterned layer 410 of FIG. 4) may be one layer constituting the display 320 and may be disposed between the pixels of the display panel and a lens of a camera module (refer to FIGS. 5 and 6).

Figure 4:
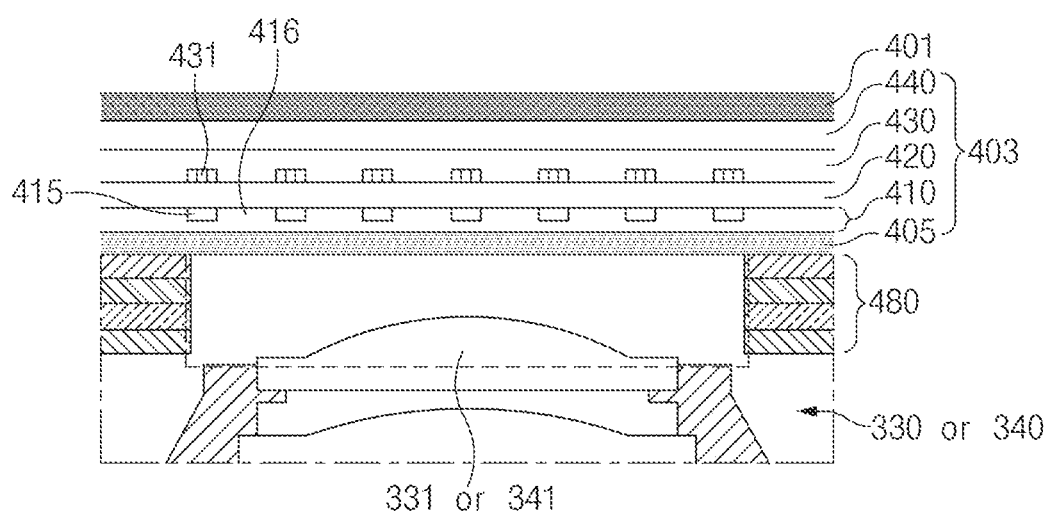
FIG. 4 is a sectional view illustrating a display panel and a camera module according to an embodiment of the disclosure.

FIG. 4 is a sectional view illustrating a display panel and a camera module according to an embodiment of the disclosure. The camera module of FIG. 4 may be one of the first camera module 330 or the second camera module 340 of FIG. 3. FIG. 4 is illustrative, and the disclosure is not limited thereto.

Referring to FIG. 4, a display (e.g., the display 320 of FIG. 3) may include a window layer 401, the display panel 403, and a protective layer (or, a shielding layer or a back cover) 480.

According to various embodiments, the window layer (e.g., ultra thin glass (UTG)) 401 may contain a polymer. In this case, the window layer 401 may contain polyethylene terephthalate (PET) or polyimide (PI). In various embodiments, the window layer 401 may include a plurality of window layers.

Although not illustrated in FIG. 4, the display 320 may further include a touch panel (a touch sensor) between the window layer 401 and the display panel 403.

According to various embodiments, the electronic device 301 may further include a member (e.g., a digitizer) that is disposed under the display 320 and that recognizes handwritten input. For example, the electronic device 301 may include a coil member disposed on a dielectric substrate to detect a resonant frequency of an electromagnetic induction type that is applied from an electronic pen. According to an embodiment, the display 320 may include control circuitry (not illustrated). For example, the control circuitry (not illustrated) may include a display driver IC (DDI) and/or a touch display driver IC (TDDI) that is disposed in a chip on panel (COP) type or a chip on film (COF) type.

According to various embodiments, the electronic device 301 may include a plurality of displays (e.g., a first display and a second display), and at least one of the plurality of displays may include a flexible characteristic. For example, the first display (e.g., the display 320) may include an on cell touch AMOLED (OCTA) display, and the second display (e.g., a flexible display) may include an unbreakable (UB) type active matrix organic light-emitting diode (OLED) display.

The display panel 403 may include a base layer 405, the patterned layer 410, a wiring layer 420, an emissive layer (or, an organic layer) 430, and an encapsulation layer (or, a protective layer) 440. Although not illustrated in FIG. 4, the display panel 403 may further include a polarizer (e.g., a polarizer film), an adhesive layer, and a touch panel. For example, the adhesive layer may be disposed between the layers as an adhesive member (e.g., an optical clear adhesive (OCA) or a pressure sensitive adhesive (PSA)).

According to various embodiments, the base layer 405 may be formed under the patterned layer 410 (e.g., in a direction toward the camera module 330 or 340). For example, the patterned layer 410, the wiring layer 420, and the emissive layer 430 may be stacked over the base layer 405. According to various embodiments, the base layer 405 may include a transparent insulating substrate (e.g., a substrate). For example, the base layer 405 may be implemented with a glass substrate, a quartz substrate, or a transparent resin substrate. For example, the transparent resin substrate may contain a polyimide-based resin, an acryl-based resin, a polyacrylate-based resin, a polycarbonate-based resin, a polyether-based resin, a sulfonic acid-based resin, and/or a polyethyleneterephthalate-based resin.

The patterned layer (or, the bottom metal layer (BML)) 410 may form a pattern in a region where at least part of the protective layer (or, the shielding layer or the back cover) 480 is removed for arrangement of the camera module 330 or 340. The patterned layer 410 may include blocking portions (or, blocking regions) 415 and openings (or, open regions) 416. The blocking portions 415 may be regions at least partially corresponding to pixels 431 of the emissive layer (the organic layer) 430, and the openings 416 may be regions at least partially corresponding to panel openings among the pixels 431 of the emissive layer (the organic layer) 430. According to an embodiment, the patterned layer 410 may be formed of a metallic material and may be formed under the wiring layer 420 by deposition and/or patterning. The patterned layer 410 may protect the pixels 431 of the emissive layer (the organic layer) 430 and may block light generated from the pixels 431. According to various embodiments, the patterned layer 410 may include a specified pattern (a black matrix) for reducing diffraction of light incident on the camera module 330 or 340, or an opaque metal layer (e.g., a buffer layer) including specified patterns.

According to various embodiments, external light passing through the openings 416 may be incident on the lens 331 or 341. For example, light may be diffracted or scattered depending on the shape or size of the openings 416, and image data distortion or image quality degradation depending on characteristics of a point spread function (PSF) may occur. A processor (or, an image processor) in the electronic device 301 may generate an image, image quality degradation of which is compensated for, by comparing or combining image data obtained by the first camera module 330 and the second camera module 340 (refer to FIG. 5 and the following drawings).

The wiring layer 420 and the emissive layer 430 may have a form in which light-emitting elements (e.g., organic electro luminescence (EL)) are deposited on a thin film transistor (TFT) substrate. According to various embodiments, the emissive layer 430 may include the pixels 431, each of which is constituted by a plurality of sub-pixels (e.g., red, green, and blue sub-pixels). According to various embodiments, the display panel 403 may include an active area (e.g., a display area) and an inactive area (e.g., a non-display area). For example, the active area may be an area corresponding to the area where the plurality of pixels 431 are disposed, and the inactive area may be an area that is disposed around the active area and that corresponds to a bezel area of the display panel 403.

According to various embodiments, the wiring layer 420 may include TFT elements for driving the respective pixels 431 in the active area, metal wiring, an insulating film, or the like. According to various embodiments, the wiring layer 420 may include a liquid crystal polymer or low temperature polycrystalline silicon (LTPS) glass, and the plurality of pixels 431 may include thin film transistors (TFTs) formed on the LTPS glass.

According to various embodiments, the emissive layer 430 may include light-emitting elements (e.g., organic electro luminescence (EL)). The organic EL may generate light when holes and electrons are injected into the organic EL from a cathode and an anode.

According to various embodiments, in a region of the display panel 403 that at least partially overlaps at least one component (e.g., the lens 331 or 341 or a sensor module (e.g., the sensor module 176 of FIG. 1)) of the electronic device 301 when the display panel 403 is viewed from the first surface (e.g., the front surface), the plurality of pixels 431 may not be disposed or may be disposed at a lower arrangement density than in a non-overlapping region.

According to various embodiments, the encapsulation layer 440 (e g, thin film encapsulation (TFE)) may include organic layers and inorganic layers alternately laminated on the emissive layer 430 to protect the light-emitting elements from oxygen or moisture. For example, the encapsulation layer 440 may be a pixel protection layer for protecting the plurality of pixels 431. For example, the encapsulation layer 440 may include encapsulation glass.

According to various embodiments, the protective layer (or, the shielding layer) 480 may support and protect the display panel 403. The protective layer 480 may block introduction of light or electromagnetic waves introduced from the display panel 403 into the electronic device 301. The protective layer 480 may include a black film and a metal (e.g., copper) plate. For example, the protective layer 480 disposed under the display panel 403 may provide a dark background for ensuring visibility of the display panel 403 and may be formed of a cushioning member (e.g., a cushion) for a buffering action. For example, the protective layer 480 may include an opaque metal layer (e.g., a black layer including an uneven pattern) for removing bubbles that are likely to be generated between the display panel 403 and objects attached to the bottom thereof and blocking light generated from the display panel 403 or light incident from the outside and/or a cushion layer (e.g., a sponge layer) disposed for shock absorbing.

According to various embodiments, the protective layer 480 may include a heat radiation member (e.g., a graphite sheet) for heat radiation and/or a conductive member (e.g., a metal plate). For example, the conductive member may help to reinforce the electronic device 301 and may be used to shield ambient noise and distribute heat released from a surrounding heat radiation part.

According to various embodiments, at least part of the protective layer 480 may be open, and the lens 331 or 341 may be disposed in the open region. The pattern of the patterned layer 410 may be formed in the region where the at least part of the protective layer 480 is removed.

Figure 5:
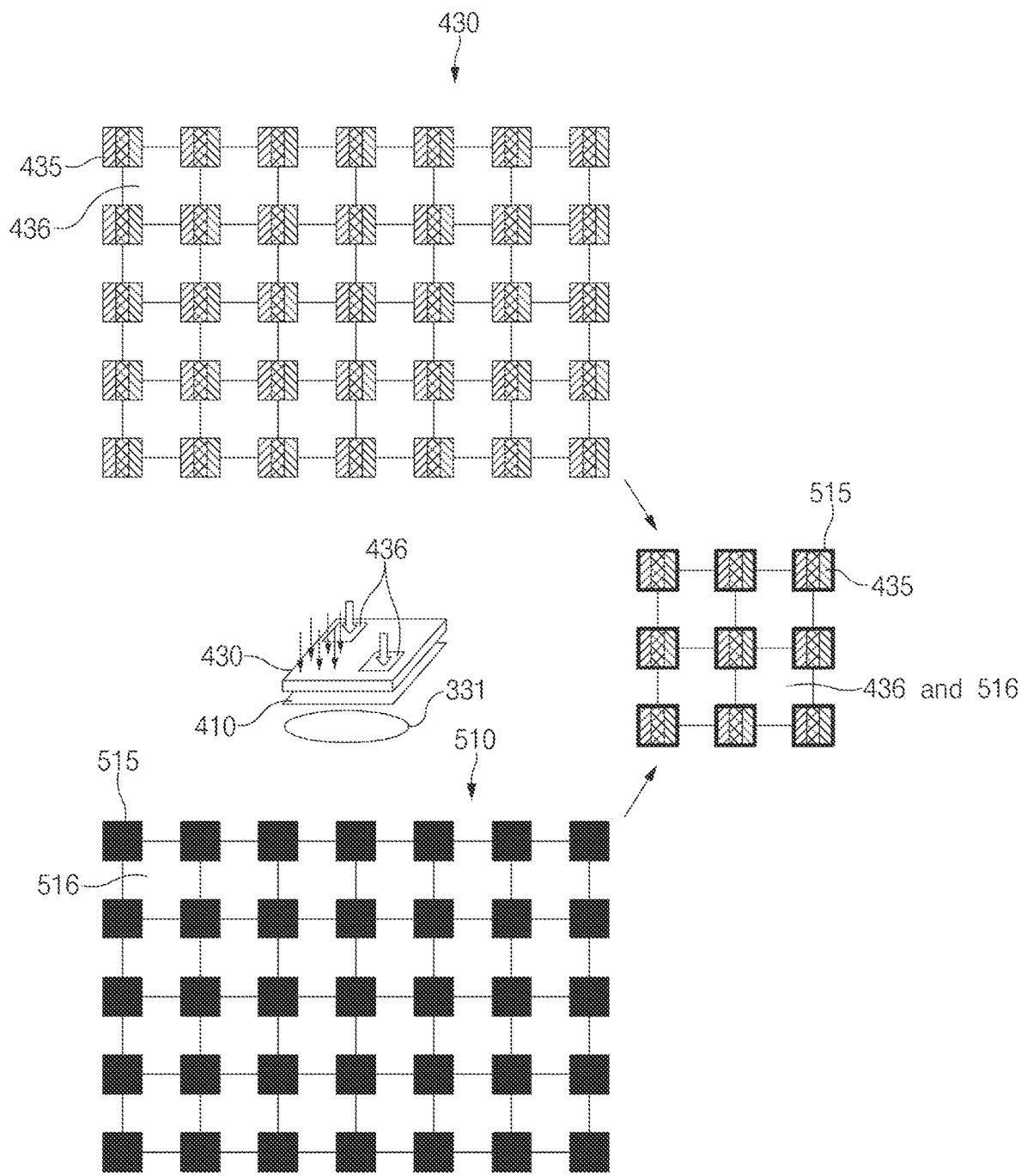
FIG. 5 illustrates a pixel structure and a first type of pattern disposed adjacent to a first camera module according to an embodiment of the disclosure.

FIG. 5 illustrates a pixel structure and a first type of pattern disposed adjacent to the first camera module according to an embodiment of the disclosure.

Referring to FIG. 5, the emissive layer 430 may include pixel regions 435 in which pixels are disposed and panel openings 436. The pixel regions 435 may be regions in which the pixels implemented with light-emitting elements (e.g., organic electro luminescence (EL)) are disposed. The panel openings 436 may be empty spaces among the pixel regions 435. The panel openings 436 may have various shapes. For example, the panel openings 436 may be cross-shaped polygons. In another example, the panel openings 436 may have a quadrilateral shape. The panel openings 436 may allow light incident from the outside to pass through, and the light passing through the panel openings 436 may reach the first lens 331 and may be used to take an image.

A first portion (hereinafter, referred to as a first patterned portion) (or, a first patterned region) 510 of the patterned layer 410 may include first blocking portions 515 and openings 516 of a first type. The first blocking portions 515 may be regions corresponding to the pixel regions 435, and the openings 516 of the first type may be regions corresponding to the panel openings 436.

The first blocking portions 515 may prevent introduction of light generated from the pixel regions 435 into the first lens 331. The openings 516 of the first type may allow light passing through the panel openings 436 to pass through.

According to an embodiment, the first blocking portions 515 may have substantially the same shape and size as the pixel regions 435. For example, the first blocking portions 515 and the pixel regions 435 may have a quadrilateral shape with substantially the same size. According to another embodiment, the first blocking portions 515 may have substantially the same shape as the pixel regions 435, but may have a different size from the pixel regions 435. For example, the first blocking portions 515 and the pixel regions 435 may have a quadrilateral shape, and the first blocking portions 515 may have a larger size than the pixel regions 435.

According to an embodiment, the openings 516 of the first type may have substantially the same shape and size as the panel openings 436. For example, the openings 516 of the first type and the panel openings 436 may be cross-shaped polygons having substantially the same size. According to another embodiment, the openings 516 of the first type may have substantially the same shape as the panel openings 436, but may have a different size from the panel openings 436. For example, the openings 516 of the first type and the panel openings 436 may be cross-shaped polygons, and the openings 516 of the first type may have a smaller size than the panel openings 436.

The first blocking portions 515 and the openings 516 of the first type may be disposed on a front surface of the first lens 331. Light passing through the panel openings 436 and the openings 516 of the first type may reach the first lens 331 and may be used to take an image. For example, when external light is diffracted or scattered in a process of passing through the panel openings 436 and the openings 516 of the first type, image distortion or image quality degradation may occur. The processor (or, the image processor) in the electronic device 301 may compare first image data obtained through the first camera module (e.g., the first camera module 330 of FIG. 3) with second image data obtained through the second camera module (e.g., the second camera module 340 of FIG. 3) and may compensate for an image, the image quality of which is degraded.

Figure 6:
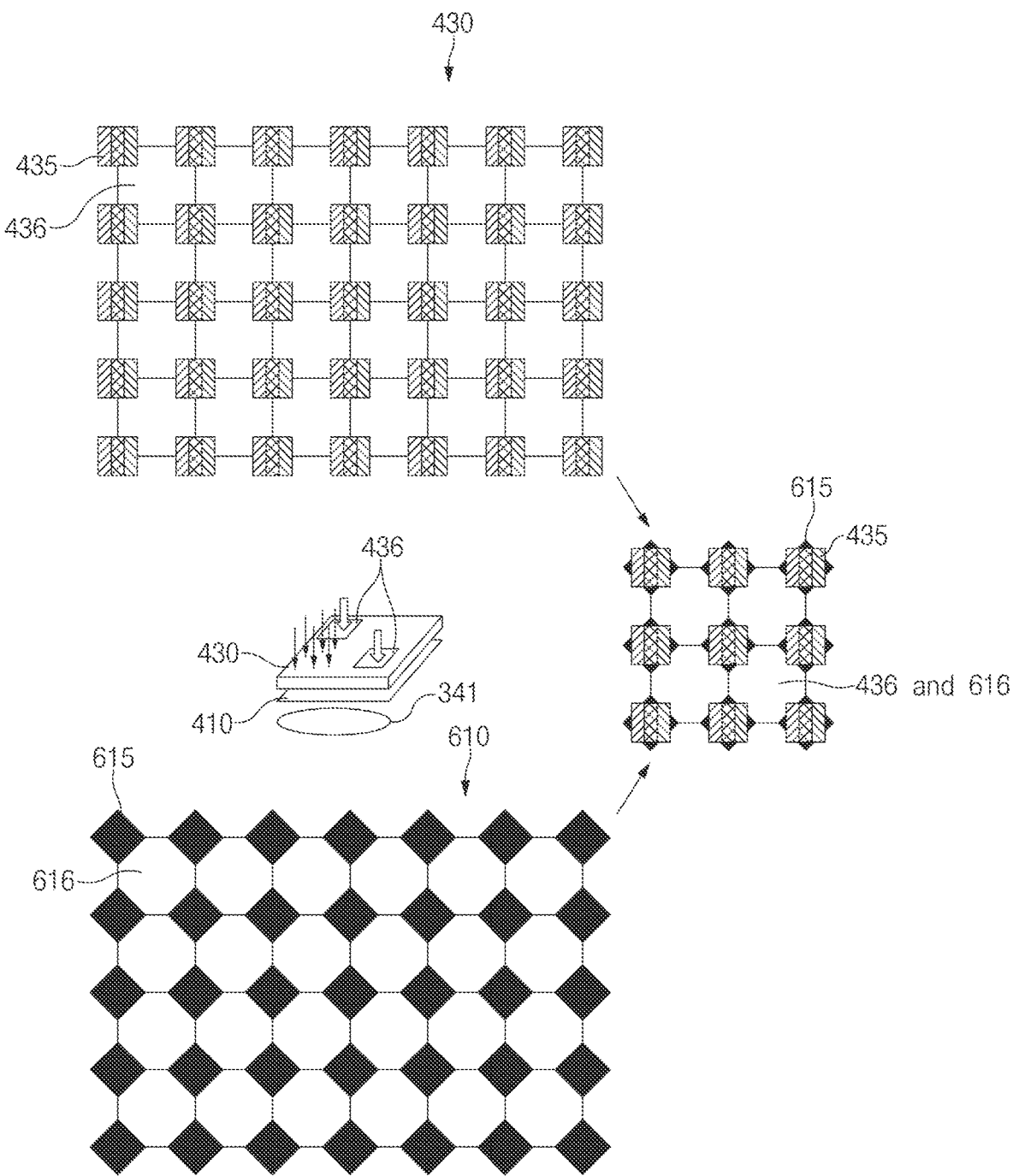
FIG. 6 illustrates a pixel structure and a second type of pattern disposed adjacent to a second camera module according to an embodiment of the disclosure.

FIG. 6 illustrates a pixel structure and a second type of pattern disposed adjacent to a second camera module according to an embodiment of the disclosure.

Referring to FIG. 6, an emissive layer 430 may include pixel regions 435 in which pixels are disposed and panel openings 436. The pixel regions 435 may be regions in which the pixels implemented with light-emitting elements (e.g., organic electro luminescence (EL)) are disposed. The panel openings 436 may be empty spaces among the pixel regions 435. The panel openings 436 may have various shapes. For example, the panel openings 436 may be cross-shaped polygons. In another example, the panel openings 436 may have a quadrilateral shape. The panel openings 436 may allow light incident from the outside to pass through, and the light passing through the panel openings 436 may reach the second lens 341 and may be used to take an image.

A second portion (hereinafter, referred to as a second patterned portion) (or, a second patterned region) 610 of the patterned layer 410 may include second blocking portions 615 and openings 616 of a second type. The second blocking portions 615 may be regions corresponding to the pixel regions 435, and the openings 616 of the second type may be regions corresponding to the panel openings 436.

The second blocking portions 615 may prevent introduction of light generated from the pixel regions 435 into the second lens 341. The openings 616 of the second type may allow light passing through the panel openings 436 to pass through.

According to an embodiment, the second blocking portions 615 may have a different shape from the pixel regions 435 and may have substantially the same size as the pixel regions 435. For example, when the pixel regions 435 have a quadrilateral shape, the second blocking portions 615 may have a rhombic shape with substantially the same size as the pixel regions 435. According to another embodiment, the second blocking portions 615 may have a difference shape and size from the pixel regions 435. For example, when the pixel regions 435 have a quadrilateral shape, the second blocking portions 615 may have a rhombic shape with a larger size than the pixel regions 435.

According to an embodiment, the second blocking portions 615 disposed on a front surface of the second lens 341 may have a shape in which the first blocking portions 515 disposed on the front surface of the first lens 331 of FIG. 5 are rotated by a specified angle. For example, when the first blocking portions 515 have a square shape, the second blocking portions 615 may have a rhombic shape in which the first blocking portions 515 are rotated by 45 degrees.

According to an embodiment, the openings 616 of the second type may have a different shape from the panel openings 436. The openings 616 of the second type and the panel openings 436 may have common main regions through which light can pass and may have different boundaries. For example, when the panel openings 436 are cross-shaped polygons, the openings 616 of the second type may have an octagonal shape.

The second blocking portions 615 and the openings 616 of the second type may be disposed on the front surface of the second lens 341. Light passing through the panel openings 436 and the openings 616 of the second type may reach the second lens 341 and may be used to take an image. For example, when external light is diffracted or scattered in a process of passing through the panel openings 436 and the openings 616 of the second type, image distortion or image quality degradation may occur. The processor (or, the image processor) in the electronic device 301 may compare second image data obtained through the second camera module (e.g., the second camera module 340 of FIG. 3) with first image data obtained through the first camera module (e.g., the first camera module 330 of FIG. 3) and may compensate for an image, the image quality of which is degraded.

When the first camera module 330 and the second camera module 340 are devices having substantially the same characteristics (e.g., MTF characteristics), image compensation may be performed through a simple operation. When the first camera module 330 and the second camera module 340 are devices having different characteristics, additional processing depending on characteristics of the camera modules may be required.

Figure 7:
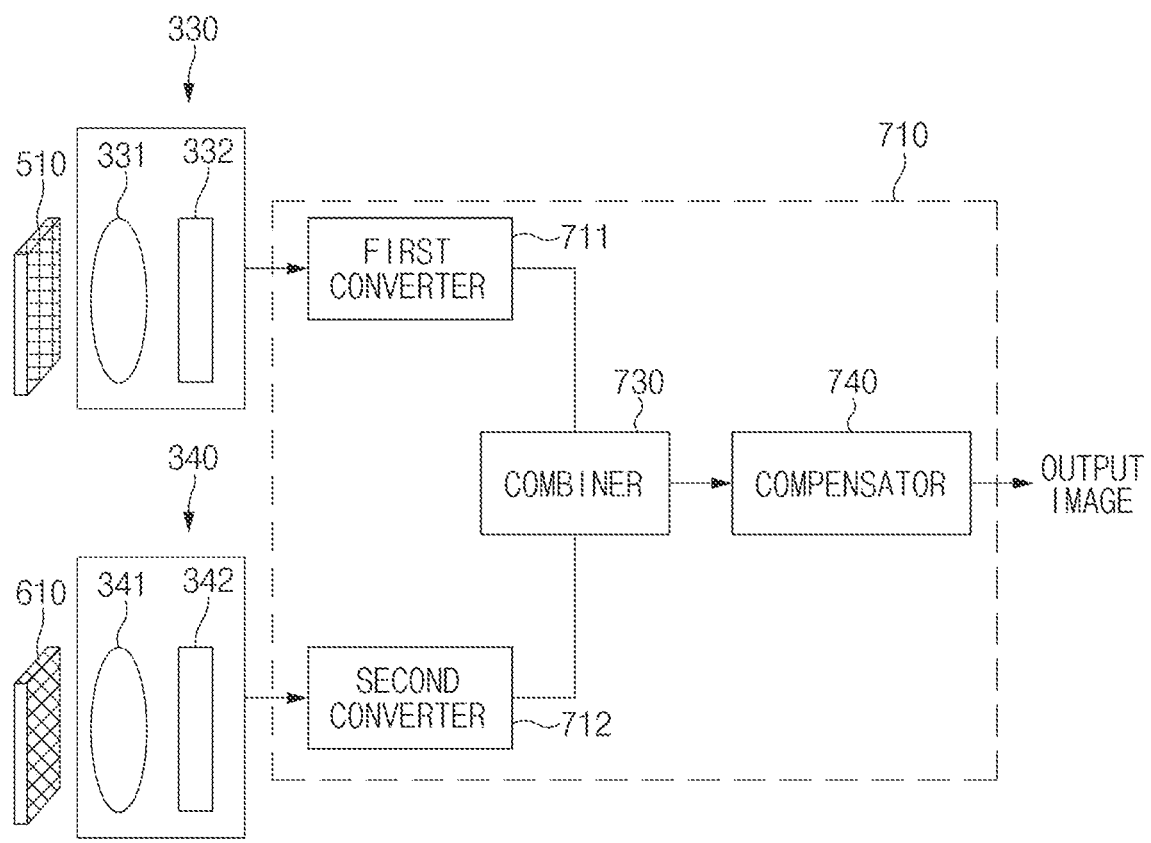
FIG. 7 illustrates a configuration of an image processor according to an embodiment of the disclosure.

FIG. 7 illustrates a configuration of an image processor according to an embodiment of the disclosure. FIG. 7 is illustrative, and the disclosure is not limited thereto. The image processor 710 may be an operation of the processor in the electronic device 301, or may be an operation by control of the processor. Alternatively, the image processor 710 may be a computing element implemented separately from the processor.

Referring to FIG. 7, a first camera module 330 may include the first lens 331 and a first image sensor 332. The first camera module 330 may collect, through the first lens 331, light passing through the first patterned portion 510.

The first image sensor 332 may convert the light collected through the first lens 331 into an electrical signal.

The second camera module 340 may include the second lens 341 and a second image sensor 342. The second camera module 340 may collect, through the second lens 341, light passing through the second patterned portion 610. The second image sensor 342 may convert the light collected through the second lens 341 into an electrical signal.

According to various embodiments, the image processor 710 may include a first converter 711, a second converter 712, a combiner 730, and a compensator 740. The components are divided depending on functions thereof, and the disclosure is not limited thereto.

The first converter 711 may convert first image data collected through the first image sensor 332. The second converter 712 may convert second image data collected through the second image sensor 342. For example, the first converter 711 and the second converter 712 may perform conversion (e.g., planar rectification) such that the first image data and the second image data are projected onto one common plane.

The combiner 730 may combine the converted first image data and the converted second image data into one image. According to an embodiment, the combiner 730 may combine (e.g., fuse) the first image data and the second image data into one image by reflecting MTF characteristics of the first camera module 330 and the second camera module 340.

The compensator 740 may compensate for (e.g., restore) attenuated signal components by reflecting characteristics of the first camera module 330 and the second camera module 340. The MTF characteristics of the first camera module 330 may be changed by the first patterned portion 510, and the MTF characteristics of the second camera module 340 may be changed by the second patterned portion 610. Attenuation of a specific signal component according to a change in MTF characteristics of the lens 331 or 341 may be a main reason for degradation in image quality of an under display camera.

For example, when the first camera module 330 and the second camera module 340 are devices having substantially the same characteristics, the combiner 730 may combine the first image data and the second image data by a simple addition method. In another example, when the first camera module 330 and the second camera module 340 are devices having different characteristics, the combiner 730 may combine the first image data and the second image data by reflecting the MTF characteristics of the first camera module 330 and the second camera module 340.

Figure 8:
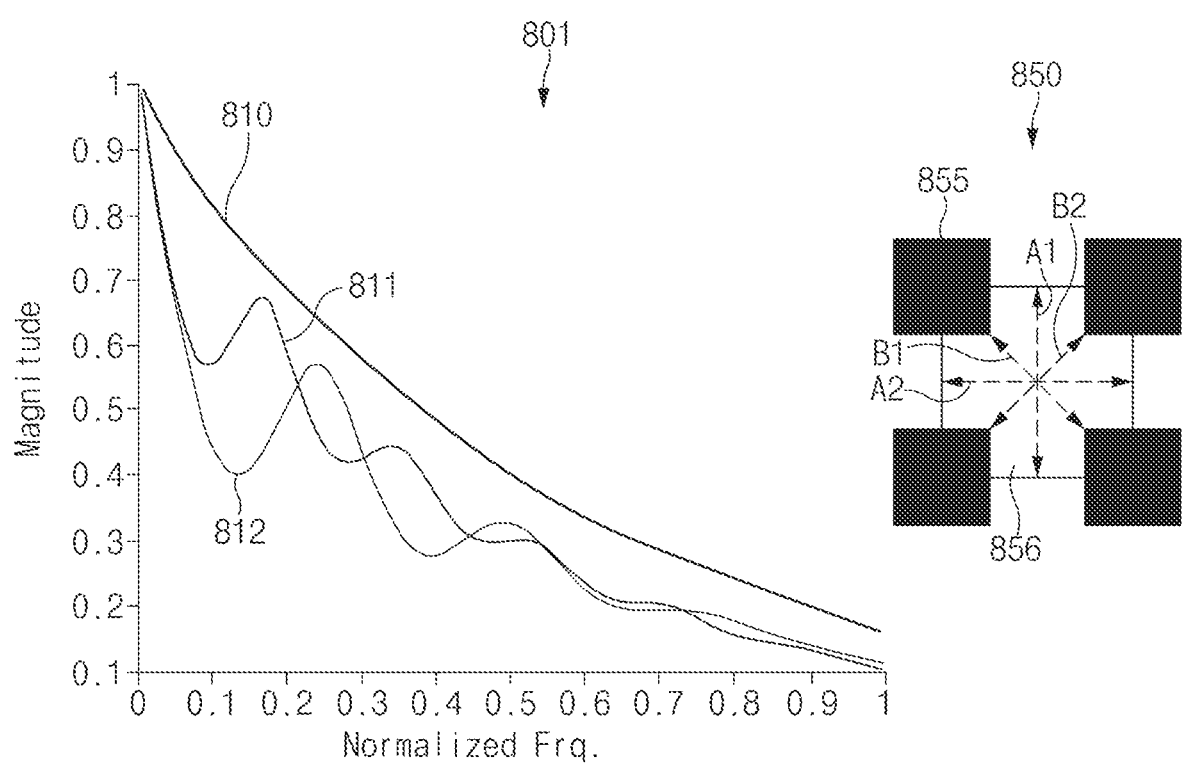
FIG. 8 illustrates a change in modulation transfer function (MTF) characteristics of an under display camera according to an embodiment of the disclosure.

FIG. 8 illustrates a change in MTF characteristics of an under display camera according to an embodiment of the disclosure. In FIG. 8, a patterned portion 850 may be a first patterned portion (e.g., the first patterned portion 510 of FIG. 5).

Referring to FIG. 8, the patterned portion 850 may include blocking portions 855 and openings 856. The MTF characteristics of the under display camera may change (e.g., change 801) due to the patterned portion 850. MTF may be a curve obtained by quantifying a change in resolution power depending on the distance from a center point of an image. The resolution power may mean the ability to express different objects such that the different objects are optically distinguishable from one another and may be associated with contrast, definition, or sharpness. For example, a camera module (e.g., the camera module 330 or 340 of FIG. 4) may obtain an MTF curve that substantially agrees with a limit diffraction curve of a lens (e.g., the lens 331 or 341 of FIG. 4) included in the camera module 330 or 340. For example, the MTF curve may mean that camera performance having a modulation transfer (e.g., a contrast input/output ratio) of a specified value or more with regard to contrast in a low-frequency band is expressed.

Unique MTF characteristics of the lens (characteristics in the absence of the patterned portion 850) may have a form in which the magnitude of MTF gradually decreases with an increase in frequency as shown in a first graph 810. The first graph 810 may have a form close to a linear form without a separate ripple. For example, in the case of the camera module 330 or 340 disposed on a rear surface (an opposite surface facing away from a surface on which an image is displayed) of a display panel (e.g., the display panel 403 of FIG. 4), diffraction or scattering having various frequencies may occur in external light introduced into the camera module 330 or 340 depending on the structure of a patterned layer (e.g., the patterned layer 410 of FIG. 4) or an emissive layer (e.g., the emissive layer 430 of FIG. 4) of the display panel 403. For example, when diffraction or scattering occurs, a phenomenon in which MTF for each frequency (e.g., spatial frequency) of light fluctuates in a curved form (e.g., a ripple form or a sine wave form) rather than a linear form (e.g., a phenomenon in which the MTF is generally lowered) may appear, and the phenomenon may degrade an image quality of the camera module 330 or 340.

For example, when the patterned portion 850 is disposed on a front surface of the lens, a specific frequency component may be attenuated depending on the lengths of the patterned portion 850 in the vertical/horizontal directions A1 and A2 or the lengths of the patterned portion 850 in the diagonal directions B1 and B2. Due to this, image quality degradation may occur. For example, the MTF characteristics of the under display camera may vary depending on the shape (e.g., the size or shape) of the patterned portion 850.

The lengths of the openings 856 in the vertical/horizontal directions A1 and A2 and the lengths of the openings 856 in the diagonal directions B1 and B2 may differ from each other.

In general, a line spread function (LSF) or a point spread function (PSF) of a lens may make an image to a diffraction limit, called an airy disk. The position in which a dark pattern appears on the image is expressed as Equation 1 below.

$$Z = 1.22 \frac{\lambda}{d}$$ Equation 1

Z: the position in which the dark pattern is formed
d: the diameter of an aperture
λ: wavelength As in Equation 1, a diffraction limit may occur in inverse proportion to the diameter of the aperture. In the case of the under display camera, diffraction characteristics may be determined depending on the lengths in the vertical/horizontal directions A1 and A2 or the lengths in the diagonal directions B1 and B2.

For example, when the patterned portion 850 is disposed on the front surface of the lens, MTF characteristics in the vertical/horizontal directions A1 and A2 may have a ripple form in which as shown in a second graph 811, attenuation occurs in a first frequency range of 0 to 0.1, a third frequency range of 0.2 to 0.3, and a fifth frequency range of 0.4 to 0.5. MTF characteristics in the diagonal directions B1 and B2 may have a ripple form in which as shown in a third graph 812, attenuation occurs in a second frequency range of 0.1 to 0.2 and a fourth frequency range 0.3 to 0.4. The MTF characteristics in the ripple form may cause image distortion and/or image quality degradation. For example, the processor may remove the ripples through a separate compensation operation (refer to FIG. 9).

According to various embodiments, when the shape of the patterned portion 850 is the same and the lengths of the patterned portion 850 are varied, the MTF characteristics may change accordingly. For example, when the lengths of the patterned portion 850 in the vertical/horizontal directions A1 and A2 or the lengths of the patterned portion 850 in the diagonal directions B1 and B2 are changed, the forms of the second graph 811 and the third graph 812 may be changed accordingly.

Figure 9:
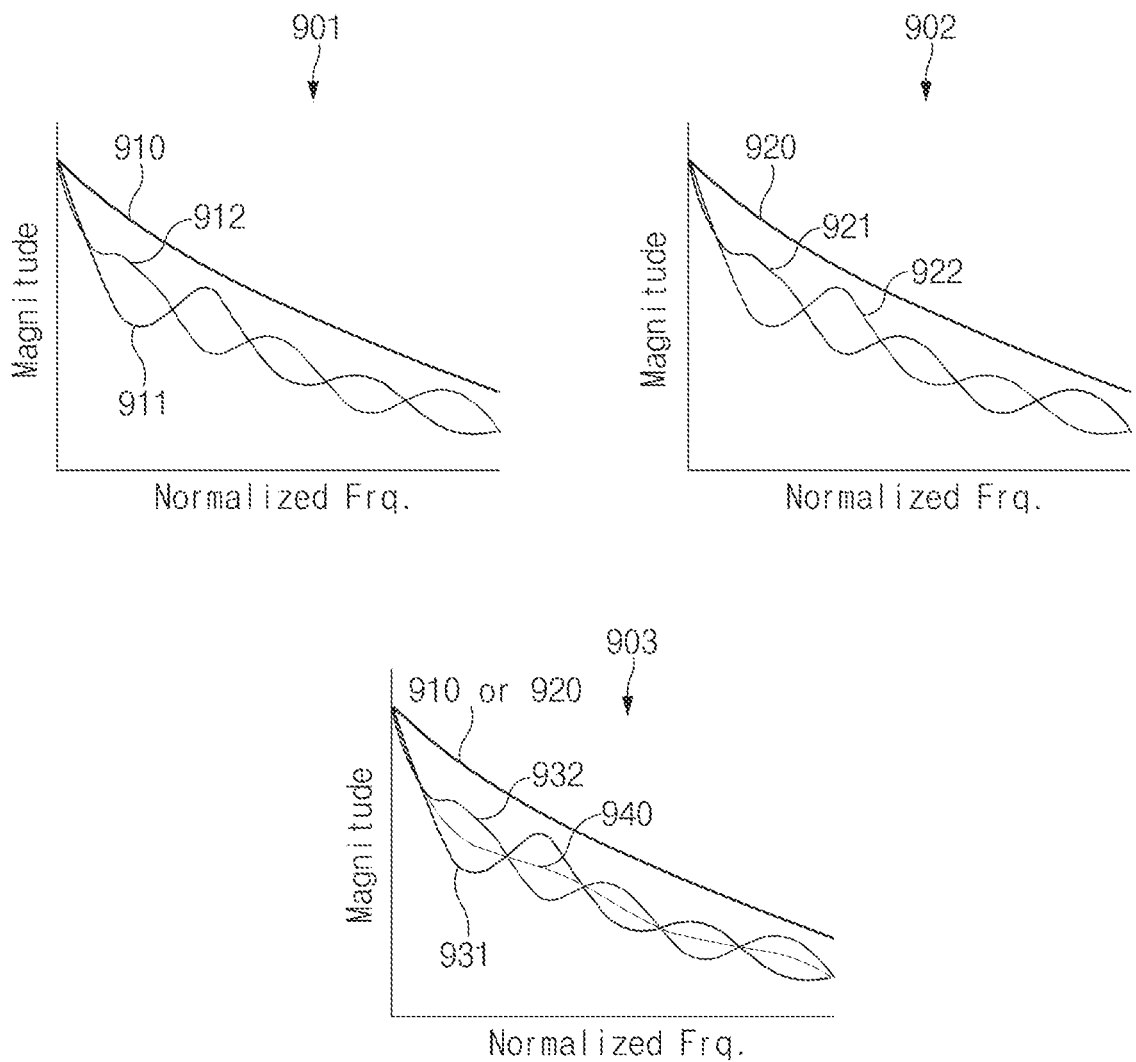
FIG. 9 illustrates compensation for image quality degradation by image combination according to an embodiment of the disclosure.

FIG. 9 illustrates compensation for image quality degradation by image combination according to an embodiment of the disclosure.

Referring to FIG. 9, in a first graph 901, unique MTF characteristics (e.g., characteristics in the absence of a first patterned portion 510 of FIG. 5) of a first lens (e.g., a first lens 331 of FIG. 5) may have a form in which as shown in a first MTF graph 910, the magnitude of MTF gradually decreases with an increase in frequency. The first MTF graph 910 may have a form close to a linear form without a separate ripple.

When the first patterned portion 510 is disposed on the front surface of the first lens 331, a specific frequency component may be attenuated depending on the vertical/horizontal direction, which is the first direction, or the diagonal direction, which is the second direction. Due to this, image quality degradation may occur.

For example, when the first patterned portion 510 is disposed on the front surface of the first lens 331, MTF graph 1-1 911 in the horizontal/vertical direction and MTF graph 1-2 912 in the diagonal direction may have a ripple form. A first ripple in the horizontal/vertical direction and a second ripple in the diagonal direction may have opposite characteristics. For example, when the first ripple in the horizontal/vertical direction increases, the second ripple in the diagonal direction may decrease, and when the first ripple in the horizontal/vertical direction decreases, the second ripple in the diagonal direction may increase.

In a second graph 902, unique MTF characteristics (e.g., characteristics in the absence of the second patterned portion 610 of FIG. 6) of a second lens (e.g., the second lens 341 of FIG. 6) may have a form in which as shown in a second MTF graph 920, the magnitude of MTF gradually decreases with an increase in frequency. The second MTF graph 920 may have a form close to a linear form without a separate ripple.

According to an embodiment, when the first camera module 330 and the second camera module 340 are devices having substantially the same characteristics, the unique MTF characteristics of the first lens 331 may be substantially the same as the unique MTF characteristics of the second lens 341.

When the second patterned portion 610 is disposed on the front surface of the second lens 341, a specific frequency component may be attenuated depending on the vertical/horizontal direction, which is the first direction, or the diagonal direction, which is the second direction. Due to this, image quality degradation may occur.

For example, when the second patterned portion 610 is disposed on the front surface of the second lens 341, MTF graph 2-1 921 in the horizontal/vertical direction and MTF graph 2-2 922 in the diagonal direction may have a ripple form. A third ripple in the horizontal/vertical direction and a fourth ripple in the diagonal direction may have opposite characteristics. For example, when the third ripple in the horizontal/vertical direction increases, the fourth ripple in the diagonal direction may decrease, and when the third ripple in the horizontal/vertical direction decreases, the fourth ripple in the diagonal direction may increase.

According to various embodiments, MTF graph 1-1 911 of the first camera module 330 in the horizontal/vertical direction may be the same as, or similar to, MTF graph 2-2 922 of the second camera module 340 in the diagonal direction. MTF graph 1-2 912 of the first camera module 330 in the diagonal direction may be the same as, or similar to, MTF graph 2-1 921 of the second camera module 340 in the horizontal/vertical direction.

According to various embodiments, the processor (e.g., the image processor 710 of FIG. 7) of the electronic device 301 may combine first image data of the first camera module 330 and second image data of the second camera module 340. For example, MTF graph 3-1 931 may be a value obtained by combining or averaging MTF graph 1-1 911 of the first camera module 330 in the horizontal/vertical direction and MTF graph 2-2 922 of the second camera module 340 in the diagonal direction. MTF graph 3-2 932 may be a value obtained by combining or averaging MTF graph 1-2 912 of the first camera module 330 in the diagonal direction and MTF graph 2-1 922 of the second camera module 340 in the vertical/horizontal direction.

In a third graph 903, a third MTF graph 940 of combined image data may have a form in which the ripples are offset and may have a form in which the magnitude of MTF gradually decreases with an increase in frequency. The third MTF graph 940 of the combined image data may be similar to the first MTF graph 910 of the second MTF graph 920.

The processor (or, the image processor 710 of FIG. 7) may use the combined image data without change, or may compensate for the combined image data in a form in which the third MTF graph 940 of the combined image data is closer to the first MTF graph 910 or the second MTF graph 920. In this case, the processor may process data having a low degree of distortion for each frequency. Accordingly, when a signal for restoration is processed (e.g., boost-up), it may be robust to mismatching for each frequency, and the compensation may be easily performed.

According to various embodiments, in a case of a multi-camera, blocking portions (e.g., the first blocking portions 515 of FIG. 3 and the second blocking portions 615 of FIG. 4) that constitute patterns disposed in the front of lenses may be rotated at different angles such that the phases of ripples cross each other. The rotation angle of each of the blocking portions may be calculated by Equation 2 below.

$$\Delta\theta = \frac{90°}{n} \qquad \text{Equation 2}$$

Δθ: the angle between BML patterns
n: the number of cameras

For example, when two cameras are disposed, the angle between patterns disposed in the front of lenses may be about 45 degrees, and when four cameras are disposed, the angle between patterns disposed in the front of lenses may be about 22.5 degrees.

Figure 10:
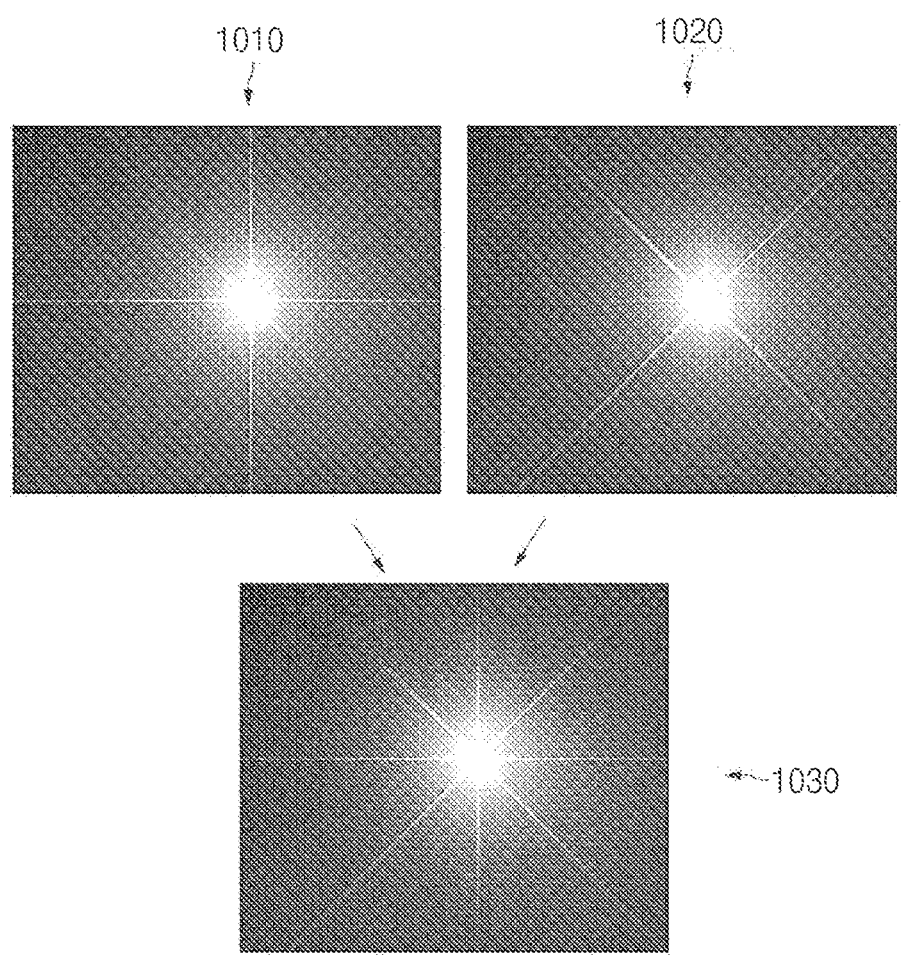
FIG. 10 illustrates a light burst effect of a light source according to an embodiment of the disclosure.

FIG. 10 illustrates a light burst effect of a light source according to an embodiment of the disclosure.

Referring to FIG. 10, when substantially the same light sources are photographed, in a first image 1010 taken with the first camera module 330, a flare in an up/down direction, which is a first direction, may be relatively long, and a flare in a diagonal direction, which is a second direction, may be relatively short. In a second image 1020 taken with the second camera module 340, a flare in the up/down direction, which is the first direction, may be relatively short, and a flare in the diagonal direction, which is the second direction, may be relatively long.

The processor may combine the first image 1010 and the second image 1020 to generate a third image 1030 including flares uniformly disposed in the first direction and the second direction. By using patterned portions (e.g., the first patterned portion 510 of FIG. 5 and the second patterned portion 610 of FIG. 6) that have different patterns, distortion may disappear, or the degree of distortion may be lowered, and the computational complexity of the processor may be reduced.

The embodiments of the disclosure disclosed in this specification and the drawings are used to easily explain technical contents according to the embodiments of the disclosure and help comprehension of the embodiments of the disclosure and are not intended to limit the scope of the disclosure. Accordingly, all modifications and embodiments derived based on the scope of the disclosure, in addition to the embodiments disclosed herein, are to be construed as being included in the scope of the disclosure.

An electronic device (e.g., the electronic device 101 of FIG. 1 or the electronic device 301 of FIG. 3) according to various embodiments may include a display panel (e.g., the display panel 403 of FIG. 3) and a first camera module (e.g., the camera module 180 of FIGS. 1 and 2 or the first camera module 330 of FIG. 3) and a second camera module (e.g., the camera module 180 of FIGS. 1 and 2 or the second camera module 340 of FIG. 3) that are disposed under the display panel (e.g., the display panel 403 of FIG. 3). The display panel (e.g., the display panel 403 of FIG. 3) may include an emissive layer (e.g., the emissive layer 430 of FIG. 4) including a plurality of pixels and a patterned layer (e.g., the patterned layer 410 of FIG. 4) disposed between the emissive layer (e.g., the emissive layer 430 of FIG. 4) and the first camera module (e.g., the camera module 180 of FIGS. 1 and 2 or the first camera module 330 of FIG. 3) or the second camera module (e.g., the camera module 180 of FIGS. 1 and 2 or the second camera module 340 of FIG. 3). The patterned layer (e.g., the patterned layer 410 of FIG. 4) may include a first patterned portion (e.g., the first patterned portion 510 of FIG. 5) disposed on a front surface of a first lens (e.g., the lens assembly 210 of FIG. 2 or the first lens 331 of FIG. 5) of the first camera module (e.g., the camera module 180 of FIGS. 1 and 2 or the first camera module 330 of FIG. 3) and a second patterned portion (e.g., the second patterned portion 610 of FIG. 6) that is disposed on a front surface of a second lens (e.g., the lens assembly 210 of FIG. 2 or the second lens 341 of FIG. 6) of the second camera module (e.g., the camera module 180 of FIGS. 1 and 2 or the second camera module 340 of FIG. 3) and that has a different shape from the first patterned portion (e.g., the first patterned portion 510 of FIG. 5).

According to various embodiments, the first patterned portion (e.g., the first patterned portion 510 of FIG. 5) may include first blocking portions (e.g., the first blocking portions 515 of FIG. 5) disposed in regions corresponding to the plurality of pixels and first openings (e.g., the openings 516 of the first type in FIG. 5) disposed in regions corresponding to spaces among the plurality of pixels. The second patterned portion (e.g., the second patterned portion 610 of FIG. 6) may include second blocking portions (e.g., the second blocking portions 615 of FIG. 6) disposed in regions corresponding to the plurality of pixels and second openings (e.g., the openings 616 of the second type in FIG. 6) disposed in regions corresponding to spaces among the plurality of pixels, and the first blocking portions (e.g., the first blocking portions 515 of FIG. 5) and the second blocking portions (e.g., the second blocking portions 615 of FIG. 6) may have different shapes.

According to various embodiments, the second blocking portions (e.g., the second blocking portions 615 of FIG. 6) may have a shape in which the first blocking portions (e.g., the first blocking portions 515 of FIG. 5) are rotated in a specified direction.

According to various embodiments, the first blocking portions (e.g., the first blocking portions 515 of FIG. 5) may have a square shape, and the second blocking portions (e.g., the second blocking portions 615 of FIG. 6) may have a rhombic shape.

According to various embodiments, the second blocking portions (e.g., the second blocking portions 615 of FIG. 6) may have the same area as the first blocking portions (e.g., the first blocking portions 515 of FIG. 5).

According to various embodiments, areas of the first blocking portions (e.g., the first blocking portions 515 of FIG. 5) and the second blocking portions (e.g., the second blocking portions 615 of FIG. 6) may be larger than or equal to areas of regions in which the plurality of pixels are disposed in the emissive layer (e.g., the emissive layer 430 of FIG. 4).

According to various embodiments, lengths of the first openings (e.g., the openings 516 of the first type in FIG. 5) in a first direction may be equal to lengths of the second openings (e.g., the openings 616 of the second type in FIG. 6) in a second direction. The first direction may form an angle of 45 degrees with the second direction.

According to various embodiments, the display panel (e.g., the display panel 403 of FIG. 3) may further include a protective layer (e.g., the protective layer 480 of FIG. 4) disposed under the patterned layer (e.g., the patterned layer 410 of FIG. 4), the protective layer (e.g., the protective layer 480 of FIG. 4) may include an open region in at least part thereof, and the first lens (e.g., the lens assembly 210 of FIG. 2 or the first lens 331 of FIG. 5) of the first camera module (e.g., the camera module 180 of FIGS. 1 and 2 or the first camera module 330 of FIG. 3) and the second lens (e.g., the lens assembly 210 of FIG. 2 or the second lens 341 of FIG. 6) of the second camera module (e.g., the camera module 180 of FIGS. 1 and 2 or the second camera module 340 of FIG. 3) may be at least partially disposed in the open region.

According to various embodiments, the protective layer (e.g., the protective layer 480 of FIG. 4) may include at least one layer that blocks light incident from the outside.

According to various embodiments, the first patterned portion (e.g., the first patterned portion 510 of FIG. 5) and the second patterned portion (e.g., the second patterned portion of FIG. 6) may be formed on a rear surface of the emissive layer (e.g., the emissive layer 430 of FIG. 4) by deposition or patterning.

According to various embodiments, the first camera module (e.g., the camera module 180 of FIGS. 1 and 2 or the first camera module 330 of FIG. 3) may have the same characteristics as the second camera module (e.g., the camera module 180 of FIGS. 1 and 2 or the second camera module 340 of FIG. 3).

According to various embodiments, the electronic device (e.g., the electronic device 101 of FIG. 1 or the electronic device 301 of FIG. 3) may further include a memory (e.g., the memory 130 of FIG. 1) and a processor (e.g., the processor 120 of FIG. 1 or the image processor 710 of FIG. 7), the processor (e.g., the processor 120 of FIG. 1 or the image processor 710 of FIG. 7) may generate a combined image by combining first image data obtained through the first camera module (e.g., the camera module 180 of FIGS. 1 and 2 or the first camera module 330 of FIG. 3) and second image data obtained through the second camera module (e.g., the camera module 180 FIGS. 1 and 2 or the second camera module 340 of FIG. 3), and the combined image may be stored in the memory (e.g., the memory 130 of FIG. 1).

According to various embodiments, the processor (e.g., the processor 120 of FIG. 1 or the image processor 710 of FIG. 7) may generate the combined image by converting the first image data and the second image data such that the first image data and the second image data are projected onto a common plane.

According to various embodiments, the processor (e.g., the processor 120 of FIG. 1 or the image processor 710 of FIG. 7) may compensate for the combined image based on characteristics of the first camera module (e.g., the camera module 180 of FIGS. 1 and 2 or the first camera module 330 of FIG. 3) or the second camera module (e.g., the camera module 180 of FIGS. 1 and 2 or the second camera module 340 of FIG. 3).

According to various embodiments, the first patterned portion (e.g., the first patterned portion 510 of FIG. 5) and the second patterned portion (e.g., the second patterned portion 610 of FIG. 6) may be implemented to have different materials or different densities.

An electronic device (e.g., the electronic device 101 of FIG. 1 or the electronic device 301 of FIG. 3) according to various embodiments may include a display panel (e.g., the display panel 403 of FIG. 3) and a plurality of camera modules (e.g., the camera module 180 of FIGS. 1 and 2 or the first camera module 330 and the second camera module 340 of FIG. 3) disposed under the display panel (e.g., the display panel 403 of FIG. 3). The display panel (e.g., the display panel 403 of FIG. 3) may include an emissive layer (e.g., the emissive layer 430 of FIG. 4) including a plurality of pixels and a patterned layer (e.g., the patterned layer 410 of FIG. 4) disposed between the emissive layer (e.g., the emissive layer 430 of FIG. 4) and the plurality of camera modules (e.g., the camera module 180 of FIGS. 1 and 2 or the first camera module 330 and the second camera module 340 of FIG. 3), and the patterned layer (e.g., the patterned layer 410 of FIG. 4) may include different patterned portions (e.g., the first patterned portion 510 of FIG. 5 and the second patterned portion 610 of FIG. 6) on front surfaces of lenses (e.g., the lens assembly 210 of FIG. 2, or the first lens 331 of FIG. 5 and the second lens 341 of FIG. 6) included in the plurality of camera modules (e.g., the camera module 180 of FIGS. 1 and 2 or the first camera module 330 and the second camera module 340 of FIG. 3).

According to various embodiments, each of the patterned portions (e.g., the first patterned portion 510 of FIG. 5 and the second patterned portion 610 of FIG. 6) may include blocking portions (e.g., the first blocking portions 515 of FIG. 5 or the second blocking portions 615 of FIG. 6) disposed in regions corresponding to the plurality of pixels and openings (e.g., the openings 516 of the first type in FIG. 5 or the openings 616 of the second type in FIG. 6) disposed in regions corresponding to spaces among the plurality of pixels.

According to various embodiments, the blocking portions (e.g., the first blocking portions 515 of FIG. 5 or the second blocking portions 615 of FIG. 6) of the patterned portions (e.g., the first patterned portion 510 of FIG. 5 and the second patterned portion 610 of FIG. 6) may have the same shape and may be sequentially rotated in a specified direction.

An image processing method according to various embodiments may be performed in an electronic device (e.g., the electronic device 101 of FIG. 1 or the electronic device 301 of FIG. 3) and may include obtaining first image data through a first camera module (e.g., the camera module 180 of FIGS. 1 and 2 or the first camera module 330 of FIG. 3) of the electronic device (e.g., the electronic device 101 of FIG. 1 or the electronic device 301 of FIG. 3) and obtaining second image data through a second camera module (e.g., the camera module 180 of FIGS. 1 and 2 or the second camera module 340 of FIG. 3) of the electronic device (e.g., the electronic device 101 of FIG. 1 or the electronic device 301 of FIG. 3), converting the first image data by reflecting a first characteristic of a first lens (e.g., the lens assembly 210 of FIG. 2 or the first lens 331 of FIG. 5) of the first camera module (e.g., the camera module 180 of FIGS. 1 and 2 or the first camera module 330 of FIG. 3) and converting the second image data by reflecting a second characteristic of a second lens (e.g., the lens assembly 210 of FIG. 2 or the second lens 341 of FIG. 6) of the second camera module (e.g., the camera module 180 of FIGS. 1 and 2 or the second camera module 340 of FIG. 3), and generating an image by combining the converted first image data and the converted second image data. The first camera module (e.g., the camera module 180 of FIGS. 1 and 2 or the first camera module 330 of FIG. 3) and the second camera module (e.g., the camera module 180 of FIGS. 1 and 2 or the second camera module 340 of FIG. 3) may be disposed under a display panel (e.g., the display panel 403 of FIG. 3) of the electronic device (e.g., the electronic device 101 of FIG. 1 or the electronic device 301 of FIG. 3), and different patterns may be formed on a front surface of the first lens (e.g., the lens assembly 210 of FIG. 2 or the first lens 331 of FIG. 5) and a front surface of the second lens (e.g., the lens assembly 210 of FIG. 2 or the second lens 341 of FIG. 6).

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device according to the various embodiments of the disclosure may compensate for image quality degradation of the under display cameras by using the different patterns of the patterned layers disposed on the front surfaces of the lenses of the plurality of camera modules.

Furthermore, the electronic device according to the various embodiments of the disclosure may compensate for image quality degradation due to diffraction or scattering of light passing through the openings of the display panel.

In addition, the electronic device according to the various embodiments of the disclosure may display a light burst effect of a light source without distortion by using the plurality of camera modules.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display panel comprising an emissive layer and a patterned layer, the emissive layer including a plurality of pixels; and
   a first camera and a second camera disposed under the display panel,
   wherein the patterned layer is disposed between the emissive layer and both the first camera and the second camera, and
   wherein the patterned layer comprises:
      a first patterned portion disposed on a front surface of a first lens of the first camera, and
      a second patterned portion disposed on a front surface of a second lens of the second camera, the second patterned portion having a different pattern than the first patterned portion.

2. The electronic device of claim 1,
   wherein the first patterned portion comprises:
      first blocking portions disposed in regions corresponding to the plurality of pixels, and
      first openings disposed in regions corresponding to spaces among the plurality of pixels,
   wherein the second patterned portion comprises:
      second blocking portions disposed in regions corresponding to the plurality of pixels, and
      second openings disposed in regions corresponding to spaces among the plurality of pixels, and
   wherein the first blocking portions and the second blocking portions have different shapes.

3. The electronic device of claim 2, wherein the second blocking portions have a shape in which the first blocking portions are rotated in a specified direction.

4. The electronic device of claim 2,
   wherein the first blocking portions have a square shape, and
   wherein the second blocking portions have a rhombic shape.

5. The electronic device of claim 2, wherein the second blocking portions have a same area as the first blocking portions.

6. The electronic device of claim 2, wherein areas of the first blocking portions and the second blocking portions are larger than or equal to areas of regions in which the plurality of pixels are disposed in the emissive layer.

7. The electronic device of claim 2, wherein lengths of the first openings in a first direction are equal to lengths of the second openings in a second direction.

8. The electronic device of claim 7, wherein the first direction forms an angle of 45 degrees with the second direction.

9. The electronic device of claim 1,
   wherein the display panel further comprises a protective layer disposed under the patterned layer,
   wherein the protective layer comprises an open region in at least part thereof, and
   wherein the first lens of the first camera and the second lens of the second camera are at least partially disposed in the open region.

10. The electronic device of claim 9, wherein the protective layer comprises at least one layer configured to block light incident from outside.

11. The electronic device of claim 1, wherein the first patterned portion and the second patterned portion are formed on a rear surface of the emissive layer by deposition or patterning.

12. The electronic device of claim 1, wherein the first camera has same characteristics as the second camera.

13. The electronic device of claim 1, further comprising:
    a memory; and
    a processor,
    wherein the processor is configured to:
       generate a combined image by combining first image data obtained through the first camera and second image data obtained through the second camera, and
    wherein the combined image is stored in the memory.

14. The electronic device of claim 13, wherein the processor is further configured to:
    generate the combined image by converting the first image data and the second image data such that the first image data and the second image data are projected onto a common plane.

15. The electronic device of claim 14, wherein the processor is further configured to:
    compensate for the combined image based on characteristics of the first camera or the second camera.

16. The electronic device of claim 1, wherein the first patterned portion and the second patterned portion are implemented to have different materials or different densities.

17. The electronic device of claim 1,
    wherein the first patterned portion comprises first blocking portions and first openings disposed on the front surface of the first lens,
    wherein the second patterned portion comprises second blocking portions and second openings disposed on the front surface of the second lens, and
    wherein second blocking portions comprises a shape corresponding to a shape of the first blocking portions being rotated 45 degrees.

18. The electronic device of claim 1,
    wherein the display panel further comprises a wiring layer disposed between the emissive layer and the patterned layer,
    wherein the wiring layer includes a low temperature polycrystalline silicon (LTPS) glass, and
    wherein the plurality of pixels include thin film transistors formed on the LTPS glass.

19. An electronic device comprising:
    a display panel comprising an emissive layer and a patterned layer, the emissive layer including a plurality of pixels; and
    a plurality of cameras disposed under the display panel,
    wherein the patterned layer is disposed between the emissive layer and the plurality of cameras, and
    wherein the patterned layer comprises different patterned portions on front surfaces of lenses included in the plurality of cameras.

20. The electronic device of claim 19, wherein each of the patterned portions comprises:
blocking portions disposed in regions corresponding to the plurality of pixels; and
openings disposed in regions corresponding to spaces among the plurality of pixels.

21. The electronic device of claim 20, wherein the blocking portions of the patterned portions have a same shape and are sequentially rotated in a specified direction.

22. An image processing method performed in an electronic device, the image processing method comprising:
obtaining first image data through a first camera of the electronic device and obtaining second image data through a second camera of the electronic device;
converting the first image data by reflecting a first characteristic of a first lens of the first camera and converting the second image data by reflecting a second characteristic of a second lens of the second camera; and
generating an image by combining the converted first image data and the converted second image data,
wherein the first camera and the second camera are disposed under a display panel of the electronic device, and
wherein different patterns of a pattern layer disposed between an emissive layer, which includes a plurality of pixels, and both the first camera and the second camera are formed on a front surface of the first lens and a front surface of the second lens.

\* \* \* \* \*